United States Patent [19]

Duerr

[11] Patent Number: 5,042,745
[45] Date of Patent: Aug. 27, 1991

[54] TILT RAMP SWEPT EDGE NOZZLE

[75] Inventor: Robert A. Duerr, Port Jefferson Station, N.Y.

[73] Assignee: Grumann Aerospace Corporation, Bethpage, N.Y.

[21] Appl. No.: 408,522

[22] Filed: Sep. 18, 1989

[51] Int. Cl.⁵ .................. B64C 15/02; B64D 33/04
[52] U.S. Cl. .................. 244/12.5; 244/23 D; 244/52; 239/265.19; 239/265.29
[58] Field of Search .................. 244/12.5, 23 D, 52, 244/207; 239/265.13, 265.19, 265.21, 265.29, 265.35, 265.37

[56] References Cited

U.S. PATENT DOCUMENTS

| 2,420,323 | 5/1947 | Meyer et al. | 244/52 |
| 2,928,238 | 3/1960 | Hawkins | 244/52 |
| 3,062,482 | 11/1962 | Frost | 244/52 |
| 3,100,377 | 8/1963 | Kosin et al. | 244/52 |
| 3,986,687 | 10/1976 | Beavers et al. | 244/52 |
| 4,641,782 | 2/1987 | Woodward | 239/265.29 |
| 4,690,329 | 9/1987 | Madden | 239/265.19 |
| 4,848,664 | 7/1989 | Thayer | 239/265.29 |

Primary Examiner—Galen Barefoot
Attorney, Agent, or Firm—Richard G. Geib; Daniel J. Tick; Bernard S. Hoffman

[57] ABSTRACT

A tilt ramp swept edge nozzle for vectoring exhaust gases from an engine mounted in an aircraft has a pair of flaps pivotally affixed to the aircraft in the area of the output end of the engine tailpipe. The flaps are in spaced relation to each other, aligned with the trailing edge of the airfoil of the aircraft and are movable to positions substantially parallel to each other and to positions substantially non-parallel to each other. An actuating system coupled to the flaps moves same relative to each other thereby to maintain a substantially constant effective throat area in the nozzle and providing an increasing nozzle aspect ratio and variable thrust direction during transition from forward to aft throat position of the nozzle.

6 Claims, 4 Drawing Sheets

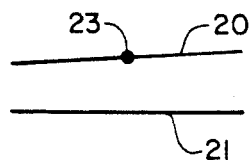
FIG.6A
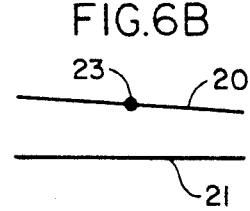
FIG.6B
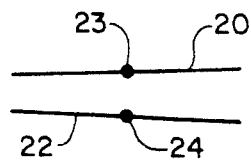
FIG.6C
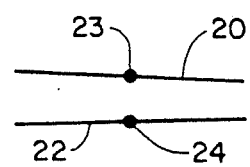
FIG.6D
FIG.7A
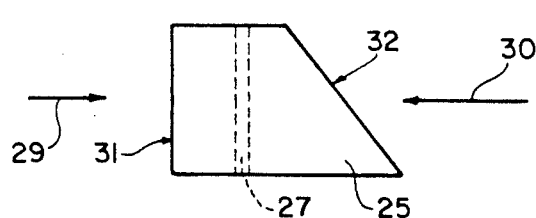
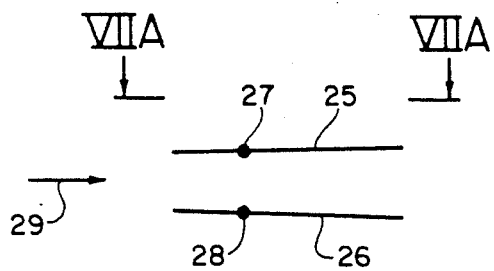
FIG.7
FIG.8A
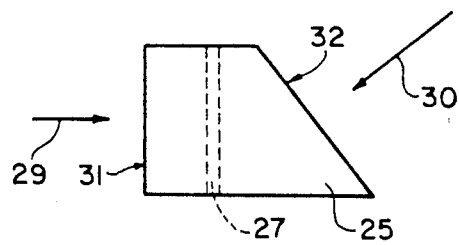
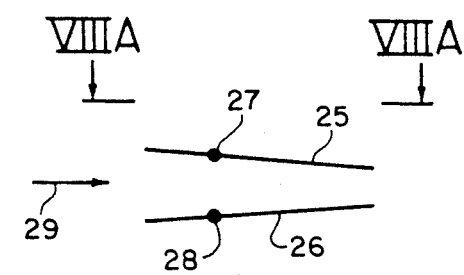
FIG.8

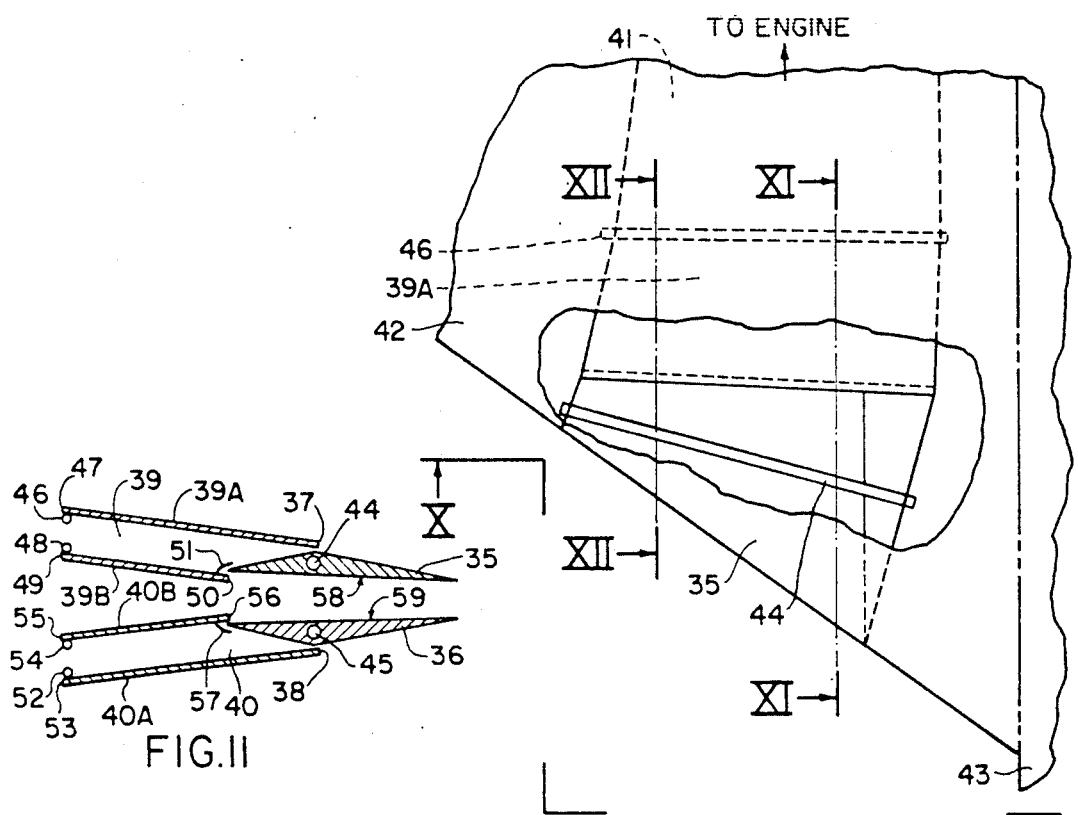
FIG.11
FIG.9
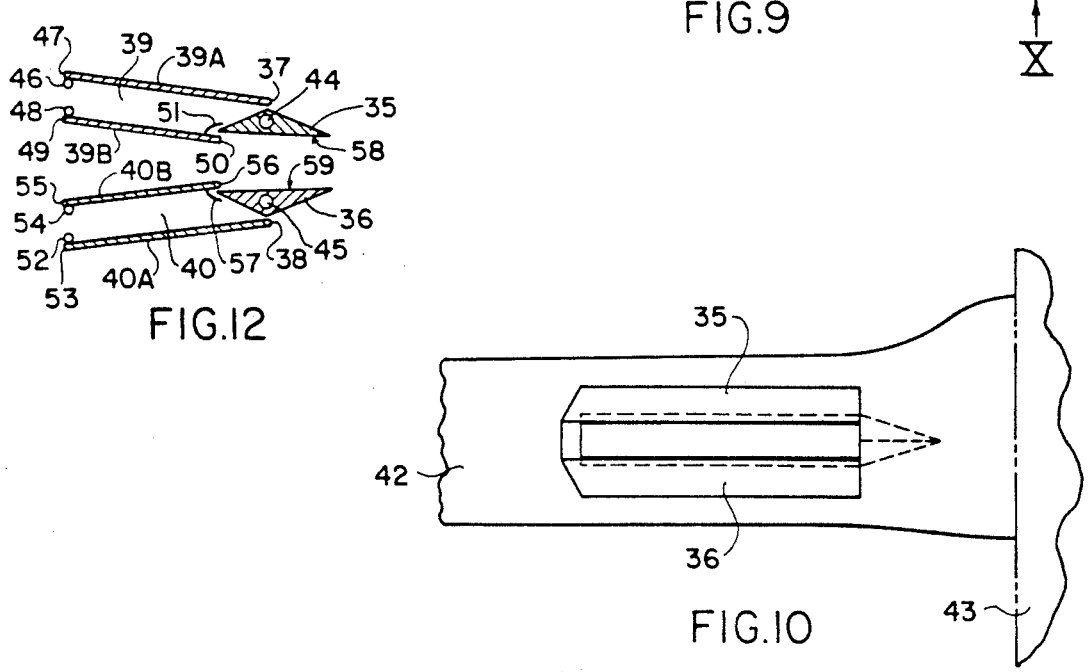
FIG.12
FIG.10

TILT RAMP SWEPT EDGE NOZZLE

BACKGROUND OF THE INVENTION

The present invention relates to a tilt ramp swept edge nozzle. More particularly, the invention relates to a tilt ramp swept edge nozzle for vectoring exhaust gases from an engine mounted in a vehicle.

The principal object of the invention is to provide a tilt ramp swept edge nozzle for the engine of a vehicle, which nozzle improves the overall vehicle maneuverability and handling characteristics.

An object of the invention is to provide a tilt ramp swept edge nozzle for the engine of a vehicle, which nozzle is applicable in the yaw mode to aft swept or forward swept trailing edges and in the pitch mode to upper or lower swept trailing edges.

Another object of the invention is to provide a tilt ramp swept edge nozzle for the engine of a vehicle, which nozzle utilizes load balanced ramps for low actuation power requirements.

Still another object of the invention is to provide a tilt ramp swept edge nozzle for the engine of a vehicle, which nozzle utilizes actuation devices mounted inside the aircraft.

Yet another object of the invention is to provide a tilt ramp swept edge nozzle for the engine of a vehicle, which nozzle has filmcooled internal surfaces.

Another object of the invention is to provide a tilt ramp swept edge nozzle for the engine of a vehicle, which nozzle exhibits rapid response time characteristics to control inputs.

Still another object of the invention is to provide a tilt ramp swept edge nozzle for the engine of a vehicle, which nozzle produces good engine-out handling characteristics.

Yet another object of the invention is to provide a tilt ramp swept edge nozzle for the engine of a vehicle, which nozzle is applicable to all practical nozzle aspect ratios.

Another object of the invention is to provide a tilt ramp swept edge nozzle for the engine of a vehicle, which nozzle exhibits reduced infrared and radar cross-section characteristics.

Still another object of the invention is to provide a tilt ramp swept edge nozzle for the engine of a vehicle, which nozzle exhibits a good nozzle thrust coefficient in all operating modes.

Yet another object of the invention is to provide a tilt ramp swept edge nozzle for the engine of a vehicle, which nozzle is efficient, effective, easily maintainable and of light weight.

BRIEF SUMMARY OF THE INVENTION

In accordance with the invention, a tilt ramp swept edge nozzle for vectoring exhaust gases from an engine mounted in a vehicle having a swept trailing edge airfoil, the engine having a tailpipe with an output end, comprises a pair of flaps pivotally affixed to the vehicle in the area of the output end of the tailpipe. The flaps are in spaced relation to each other, aligned with the trailing edge of the airfoil of the vehicle and being movable to positions substantially parallel to each other and to positions substantially non-parallel to each other. First actuating means coupled to the flaps moves the flaps relative to each other thereby to maintain a substantially constant effective throat area in the nozzle and provides an increasing nozzle aspect ratio during transition form forward to aft throat position of the nozzle. The moving of the flaps relative to each other also provides a variable thrust direction.

The flaps have the same configuration including a leading edge and a trailing edge non-parallel to the leading edge whereby the direction of a thrust provided by the flaps is determined by the position of the flaps relative to each other.

The nozzle further comprises a pair of transition ramps extending aft from the tailpipe. The transition ramps are in spaced non-parallel relation to each other and have leading edges coupled to the tailpipe at the output end thereof and trailing edges. The flaps are pivotally affixed to the vehicle at the trailing edges of the ramps.

Each of the ramps comprises a pair of spaced substantially parallel structural members coupled to the tailpipe. Each of the pair of structural members consists of an outer member and an inner member, at least one of which is pivotally affixed to the tailpipe.

Each of the ramps further comprises a restraint on the inner member extending in an area between the inner and outer members for controlling the positioning of the flap affixed at the trailing edge thereof.

The nozzle further comprises second actuating means coupled to the outer members of the ramps for moving the ramps slightly relative to each other.

In accordance with the invention, a tilt ramp swept edge nozzle for vectoring exhaust gases from twin engine exhausts or engines mounted in a swept wing jet aircraft, each of the engine exhausts or engines having a tailpipe with an output end, comprises two pairs of flaps, each pivotally affixed to the vehicle in the area of the output end of a corresponding one of the tailpipes. The flaps of each pair of flaps are in spaced relation to each other, aligned with the trailing edge of the wing of the aircraft and movable to positions substantially parallel to each other and to positions substantially non-parallel to each other. First actuating means coupled to the flaps moves same relative to each other thereby to maintain a substantially constant effective throat area in the nozzle of each of the tailpipes and provides an increasing nozzle aspect ratio during transition from forward to aft throat position of the nozzle of each set of the tailpipes. The moving of the flaps relative to each other also provides a variable thrust direction.

The flaps of each pair of flaps have substantially the same configuration, including a leading edge and a trailing edge non-parallel to the leading edge whereby the direction of a thrust is determined by the position of the flaps of each pair of flaps relative to each other.

The nozzle of each of the tailpipes further comprises two pairs of transition ramps, each extending aft from the corresponding tailpipe. The ramps of each pair of transition ramps are in spaced non-parallel relation to each other and have leading edges coupled to the corresponding tailpipe at the output end thereof and trailing edges. The flaps of each pair of flaps are pivotally affixed to the wing at the trailing edges of the ramps of each pair of ramps.

Each ramp of each pair of ramps comprises a pair of spaced substantially parallel structural members coupled to the corresponding tailpipe. Each of the pair of structural members consists of an outer member and an inner member, at least one of which is pivotally affixed to the corresponding tailpipe.

Each ramp of each pair of ramps further comprises a restraint on the inner member extending in an area between the inner and outer members for controlling the positioning of the flap affixed at the trailing edge thereof.

The nozzle of each of the tailpipes further comprises second actuating means coupled to the outer members of each ramp of each pair of ramps for moving the ramps of each pair of ramps slightly relative to each other.

BRIEF DESCRIPTION OF THE DRAWINGS

In order that the invention may be readily carried into effect, it will now be described with reference to the accompanying drawings, wherein:

FIGS. 6A, 6B, 6C and 6D are schematic diagrams which illustrate the operating principle of the concept of the invention;

FIG. 7 is a schematic diagram of a pair of pivotally mounted bodies in nominal position relative to each other;

FIG. 7A is a top view, taken along the lines VIIA—VIIA, of FIG. 7;

FIG. 8 is a schematic diagram of a pair of pivotally mounted bodies in vectored position relative to each other;

FIG. 8A is a top view, taken along the lines VIIIA—VIIIA, of FIG. 8;

FIG. 9 is a schematic diagram, partly cut away, of an embodiment of the tilt ramp swept edge nozzle of the invention installed in an aircraft;

FIG. 10 is a rear view, taken along the lines X—X, of FIG. 9;

FIG. 11 is a cross-sectional view, taken along the lines XI—XI, of FIG. 9 in aft-directed position;

FIG. 12 is a cross-sectional view, taken along the lines XII—XII, of FIG. 9 in aft-directed position;

DETAILED DESCRIPTION OF PREFERRED EMBODIMENTS

Figure 1:
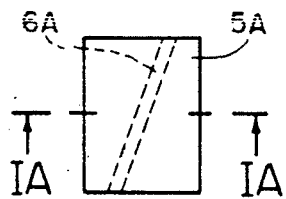
FIG. 1 is a top view of a first embodiment of a flap body.
Figure 2:
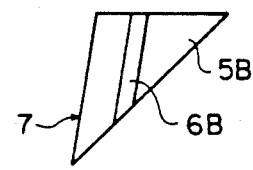
FIG. 2 is a top view of a second embodiment of a flap body.
Figure 1A:
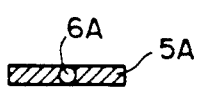
FIG. 1A is a cross-sectional view, taken along the lines IA—IA, of FIG. 1.
Figure 2A:
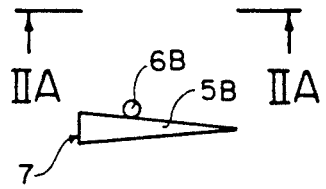
FIG. 2A is an end view, taken along the lines IIA—IIA, of FIG. 2.

FIGS. 1, 1A, 2, 2A, 3, 3A, 4 and 4A show different-shaped flap bodies of types which may be used with the nozzle of the invention. The flap body 5A of FIGS. 1 and 1A is of rectangular configuration and has an internal, skewed pivot pin 6A, or other suitable pivot or hinge means, extending therethrough. The flap body 5B of FIGS. 2 and 2A is of triangular configuration in four of its surfaces and rectangular in one of its surfaces and has an external pivot pin 6B, or other suitable pivot or hinge means, extending along one triangular surface thereof substantially parallel to an edge 7 thereof.

Figure 3:
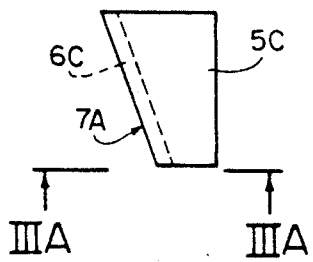
FIG. 3 is a top view of a third embodiment of a flap body.
Figure 4:
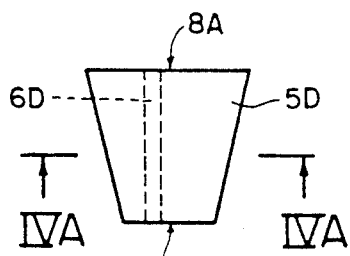
FIG. 4 is a top view of a fourth embodiment of a flap body.
Figure 3A:
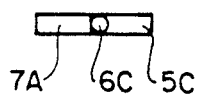
FIG. 3A is an end view, taken along the lines IIIA—IIIA, of FIG. 3.
Figure 4A:
FIG. 4A is a cross-sectional view, taken along the lines IVA—IVA, of FIG. 4.

The flap body 5C of FIGS. 3 and 3A is of trapezoidal configuration in two of its surfaces and rectangular in four of its surfaces and has an internal pivot pin 6C, or other suitable pivot or hinge means, extending therethrough along one edge 7A thereof. The flap body 5D of FIGS. 4 and 4A is an airfoil of trapezoidal configuration in two of its surfaces and has an internal pivot pin 6D, or other suitable pivot or hinge means, extending therethrough perpendicular to its adjacent and end surfaces 8A and 8B, respectively.

The flap body has a pivot or hinge device in or on its three-dimensional body configured so as to permit rotation of the body about the rotary axis of said pivot or hinge device. The pivot device may be in any location and orientation with respect to the flap body, either internally or externally.

Figure 5:
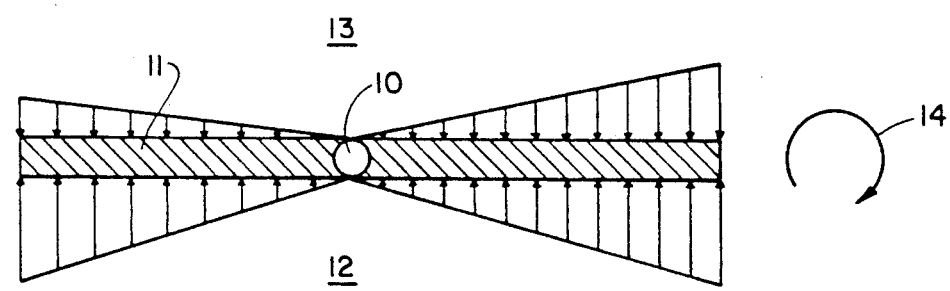
FIG. 5 shows load balance of moments about the pivot or hinge device of a flap body.

The location and orientation of the pivot pin or hinge with respect to the flap body determines the amount of edge movement on each side for every degree of rotation about the pivot pin. If the pivot pin 10 is located close to the centroid of the flap body's wetted surface area, the moment generated about said pivot pin by the forward portion of the flap body 11 is approximately offset by the opposing moment generated by the aft portion of said flap body, as shown in FIG. 5. These moments are generated by the unbalanced pressure forces on the internal and external surfaces 12 and 13, respectively, of the flap body 11 (FIG. 5). The magnitude of the net moment must be absorbed by the actuation and mounting system utilized. The minimum net moment and direction to be offset is shown as 14 in FIG. 5.

The operating principle of the aforedescribed concept involves the utilization of a pivotally mounted or hinged body configuration in conjunction with either a fixed surface, as shown in FIGS. 6A and 6B, or another, not necessarily identical, pivotally mounted or hinged body configuration, as shown in FIGS. 6C and 6D. In FIGS. 6A, 6B, 6C and 6D, the upper body or surface 20 is pivotally mounted or hinged. The lower body or surface 21 is fixed in FIGS. 6A and 6B and the lower surface 22 is also pivotally mounted or hinged in FIGS. 6C and 6D. Rotation of the upper body 20 (FIGS. 6A, 6B, 6C and 6D) or the lower body 22 about its pivot axis 23 (FIGS. 6A, 6B, 6C and 6D) or 24 (FIGS. 6C and 6D), respectively, only a few degrees results in the minimum distance between the two opposing bodies or surfaces shifting from end to end, in the manner of a playground seesaw relative to the ground. The minimum distance is at the left side in FIGS. 6A and 6C and at the right side in FIGS. 6B and 6D.

The tilt ramp concept applies the aforedescribed principle by forming a two-dimensional engine nozzle from an opposing pair of bodies or surfaces, one or both of which is or are pivotally mounted or hinged, with fixed sidewalls. The throat or minimum flow area of the gas can be made to shift axially between the leading and trailing edges of the moving surfaces or bodies of the nozzle by appropriate design of the flow path.

If the leading and trailing edges of each surface or body are not parallel, the throat planes at the limits of movement will not be parallel. Since the thrust vector direction is conventionally defined as being perpendicular to the throat plane, rotation of the body or bodies about the pivot axis or axes produces a shift in the direction of the nozzle flow's resultant thrust vector. This is shown in FIGS. 7, 7A, 8 and 8A.

In FIG. 7, the bodies 25 and 26 are in nominal position relative to each other. The body 25 is rotatable about a pivot 27 and the body 26 is rotatable about a pivot 28, as shown in FIG. 7. In FIGS. 7 and 7A, the gas flow 29 results in a thrust 30 (FIG. 7A), which is substantially perpendicular to the leading edge 31 of the bodies 25 and 26 and angularly disposed relative to the trailing edge 32 of said bodies, which trailing edge is non-parallel to said leading edge.

In FIG. 8, one or both of the bodies 25 and 26 has been rotated slightly about its pivotal axis 27 or 28, respectively, so that said bodies are in vectored position relative to each other. The gas flow 29, as shown in FIGS. 8 and 8A, results in the thrust 30 (FIG. 8A) being substantially perpendicular to the trailing edge 32 of the bodies 25 and 26 and angularly disposed relative to the leading edge 31 of said bodies.

FIGS. 9, 10, 11 and 12 show an embodiment of the tilt ramp swept edge nozzle of the invention. In FIGS. 9 to 12, a pair of spaced flaps 35 and 36 are pivotally affixed to the trailing edges 37 and 38, respectively, of a pair of spaced transition ramps 39 and 40, respectively, extending aft from the tailpipe 41 of an engine. The engine is one of a twin engine forward swept wing aircraft. The other engine is similarly equipped in its tailpipe. The nozzle of the invention provides yaw vectoring inputs.

Figure 13:
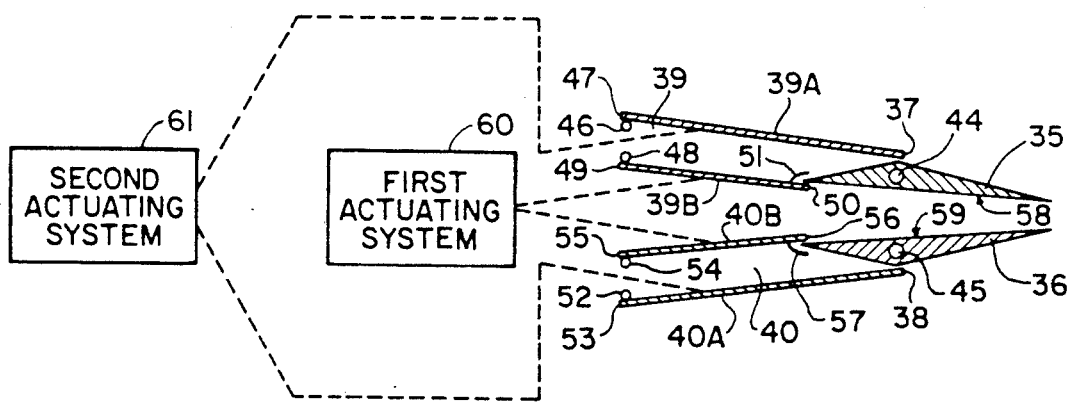
FIG. 13 is a cross-sectional view, taken along the lines XI—XI, of FIG. 9 in maximum yaw vectored position.
Figure 14:
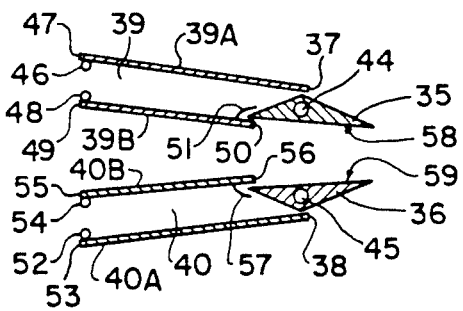
FIG. 14 is a cross-sectional view, taken along the lines XII—XII, of FIG. 9 in maximum yaw vectored position.

The nozzle is provided in the wing 42 of the aircraft 43. The flaps 35 and 36 are aligned with the trailing edge of the airfoil or wing 42 of the aircraft 43 and extend aft of the transition ramps 39 and 40 and are movable about pivots or hinges 44 and 45, respectively, to positions substantially parallel to each other, as shown in FIGS. 9 to 12, in which the throat is in the most forward position along the ramps and the resultant thrust vector is nominally aligned with the center of gravity of the aircraft 43, and to positions substantially non-parallel to each other, as shown in FIGS. 13, and 14, in which the nozzle flaps 35 and 36 are rotated four degrees about their pivots 44 and 45, respectively, so that the throat is shifted to the swept trailing edge.

The transition ramps 39 and 40 are upstream of the flaps 35 and 36 and provide flexibility of movement between the fixed engine tailpipe 41 and said flaps. Fixed surfaces function as sidewalls for the entire length of the flow path. The transition ramps 39 and 40 are pivotally affixed to the tailpipe 41 and form trailing edges of said tailpipe. The transition ramp 39 consists of a pair of spaced substantially parallel structural members 39A and 39B. The member 39A is pivotally affixed to the tailpipe 41 via a pivot or hinge 46 at its leading edge 47 and has the trailing edge 37. The member 39B is pivotally affixed to the tailpipe 41 via a pivot or hinge 48 at its leading edge 49 and has a trailing edge 50. An upper restraint 51, which is outside the main gas flow path, between the members 39A and 39B, provides positioning control of the flap 35.

The transition ramp 40 consists of a pair of spaced substantially parallel structural members 40A and 40B. The member 40A is pivotally affixed to the tailpipe 41 via a pivot or hinge 52 at its leading edge 53 and has the trailing edge 38. The member 40B is pivotally affixed to the tailpipe 41 via a pivot or hinge 54 at its leading edge 55 and has a trailing edge 56. A lower restraint 57, which is outside the main gas flow path, between the members 40A and 40B, provides positioning control of the flap 36.

A film cooling stream may be provided on the surfaces 58 and 59 of the flaps 35 and 36, respectively, as well as on the members 39B and 40B. The structural members 39A and 40A of the ramps may be either fixed or movable.

A first actuating system 60 of any suitable known type is coupled to the structural members 39B and 40B, which locate the flaps 35 and 36, as shown in FIG. 13, for moving same relative to each other thereby to maintain a substantially constant effective throat area in the nozzle and to provide an increasing nozzle aspect ratio and variable thrust direction during transition from forward to aft throat location of said nozzle.

A second actuating system 61 of any suitable known type is coupled to the structural members 39A and 40A of the ramps 39 and 40, respectively, as shown in FIG. 13, for moving same slightly relative to each other to provide clearance for the motion of the flaps 35 and 36. The second actuating system 61 may also move the structural members as speed brakes for supplemental or emergency pitch/yaw/drag force inputs to the aircraft 43.

The location and orientation of the pivots or hinges and the geometrical configuration of the flaps 35 and 36 is specifically selected to result in a nominally constant effective throat area throughout the actuation range which minimizes impact on engine operation. The actual nozzle aspect ratio substantially increases during transition from forward to aft throat position. The selection of the pivot or hinge location in each flap must also consider the operating environment and structural load integration into the main vehicle or aircraft 43. Designs for minimum net pivot or hinge moments and angular translation over the range of operation result in reductions in actuator size and excellent actuation response rates for improved vehicle integration and controllability. Consideration of installation constraints and reliability will determine whether each pair of flaps 35 and 36 will be driven by a single actuator linked to both flaps or by twin actuators with each dedicated to an individual flap.

Some of the potentially adverse effects of an engine out are minimized when the upstream limit of nozzle movement is oriented toward the center of gravity of the vehicle or aircraft 43, because the remaining engine's thrust does not generate a substantial moment which must be offset by a control input to maintain vehicle stability. The alignment of the center of gravity may be selected only during emergency operation with direct aft thrust alignment selected during multiple nozzle operation. Intermediate thrust vector angles may also be provided by stopping the actuation process at the appropriate point in the transition.

In the embodiment of FIGS. 9 to 14, the aircraft 43 has forward swept wings 42 mounted near the aft end of the fuselage and the nozzle of the invention may provide limited operational control to said aircraft even if the function of the nozzle on one side is completely lost. Positive yaw forces to the aircraft 43 are input from actuation of the left side speed brakes and negative yaw forces may be generated by the left side nozzle vectoring mechanism.

The concept of the nozzle of the invention is applicable to the entire practical range of nozzle aspect, which is nozzle width over height ratios, although the aforedescribed examples have aspect ratios significantly greater than one. Generally, the advantages of a nozzle having a non-unity aspect ratio include better vehicle-nozzle integration and improved nozzle gas flow/ambient flow mixing. These aspect ratios also provide for integration of shaping techniques for reducing the levels of observables.

The nozzle of the invention provides higher nozzle thrust coefficients than conventional vectoring schemes, since the vectoring is not accomplished by "scrubbing" the gas flow along a vectored surface. Since both the amount of moving hardware and the range of travel are reduced from conventional schemes, the nozzle of the invention is lighter in weight than known devices.

Although shown and described in what is believed to be the most practical and preferred embodiment, it is apparent that departures from the specific nozzle described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

I claim:

1. A tilt ramp swept edge nozzle for vectoring exhaust gases from an engine mounted in a vehicle having a swept trailing edge airfoil, said engine having a tailpipe with an output end, said nozzle comprising
   a pair of flaps pivotally affixed to said vehicle in the area of the output end of said tailpipe, said flaps being in spaced relation to each other, aligned with the trailing edge of the airfoil of said vehicle and being movable to positions substantially parallel to each other and to positions substantially non-parallel to each other;
   first actuating means coupled to said flaps for moving same relative to each other thereby to maintain a substantially constant effective throat area in said nozzle and providing an increasing nozzle aspect ratio during transition from forward to aft throat position of said nozzle;
   a pair of transition ramps extending aft from said tailpipe, said transition ramps being spaced in non-parallel relation to each other and having leading edges coupled to said tailpipe at the output end thereof and trailing edges, said flaps being pivotally affixed to said vehicle at the trailing edges of said ramps, each of said ramps comprising a pair of spaced substantially parallel structural members coupled to said tailpipe, each of said pair of structural members consisting of an outer member and an inner member, at least one of which is pivotally affixed to said tailpipe.

2. A tilt ramp swept edge nozzle as claimed in claim 1, where each of said ramps further comprises a restraint on said inner member extending in an area between the inner and outer members for controlling the positioning of the flap affixed at the trailing edge thereof.

3. A tilt ramp swept edge nozzle as claimed in claim 1, wherein said nozzle further comprises second actuating means coupled to the outer members of said ramps for moving said ramps slightly relative to each other.

4. A tilt ramp swept edge nozzle for vectoring exhaust gases from engines mounted in a swept wing jet aircraft, each of said engines having a tailpipe with an output end, said nozzle comprising
   two pairs of flaps, each pivotally affixed to said vehicle in the area of the output end of a corresponding one of said tailpipes, the flaps of each pair of flaps being in spaced relation to each other, aligned with the trailing edge of the wing of said aircraft and movable to positions substantially parallel to each other and to positions substantially non-parallel to each other;
   first actuating means coupled to said flaps for moving same relative to each other thereby to maintain a substantially constant effective throat area in the nozzle of each of said tailpipes and providing an increasing nozzle aspect ratio during transition from forward to aft throat position of the nozzle of each of said tailpipes; and
   two pairs of transition ramps each extending aft from a corresponding one of the said tailpipes, the ramps of each pair of transition ramps being in spaced non-parallel relation to each other and having leading edges coupled to said corresponding tailpipe at the output end thereof and trailing edges, the flaps of each pair of flaps being pivotally affixed to said wing at the trailing edges of the ramps of each pair of ramps, each ramp of each pair of ramps comprising a pair of spaced substantially parallel structural members coupled to the corresponding tailpipe, each of said pair of structural members consisting of an outer member and an inner member, at least one of which is pivotally affixed to said corresponding tailpipe.

5. A tilt ramp swept edge nozzle as claimed in claim 4, wherein each ramp of each pair of ramps further comprises a restraint on said inner member extending in an area between said inner and outer members for controlling the positioning of the flap affixed at the trailing edge thereof.

6. A tilt ramp swept edge nozzle as claimed in claim 4, wherein said nozzle of each of said tailpipes further comprises second actuating means coupled to said outer members of each ramp of each pair of ramps for moving the ramps of each pair of ramps slightly relative to each other.

* * * * *